United States Patent
Yang et al.

(10) Patent No.: US 10,122,402 B2
(45) Date of Patent: Nov. 6, 2018

(54) METHOD AND APPARATUS FOR A TUNABLE ANTENNA

(71) Applicant: Futurewei Technologies, Inc., Plano, TX (US)

(72) Inventors: Shing Lung Steven Yang, San Diego, CA (US); Ping Shi, San Diego, CA (US); Daejoung Kim, San Diego, CA (US); Wee Kian Toh, San Diego, CA (US); Navid Nader, San Diego, CA (US); Guangdong Jiang, Beijing (CN)

(73) Assignee: Futurewei Technologies, Inc., Plano, TX (US)

( * ) Notice: Subject to any disclaimer, the term of this patent is extended or adjusted under 35 U.S.C. 154(b) by 80 days.

(21) Appl. No.: 13/732,097

(22) Filed: Dec. 31, 2012

(65) Prior Publication Data

US 2014/0187178 A1 Jul. 3, 2014

(51) Int. Cl.
*H04B 1/40* (2015.01)
*H01Q 9/06* (2006.01)
*H01Q 9/42* (2006.01)
*H01Q 5/392* (2015.01)
*H01Q 1/24* (2006.01)

(52) U.S. Cl.
CPC .............. *H04B 1/40* (2013.01); *H01Q 5/392* (2015.01); *H01Q 9/06* (2013.01); *H01Q 9/42* (2013.01); *H01Q 1/243* (2013.01)

(58) Field of Classification Search
USPC ............................ 455/77; 343/745, 746, 748
See application file for complete search history.

(56) References Cited

U.S. PATENT DOCUMENTS

| | | | | |
|---|---|---|---|---|
| 5,774,062 | A * | 6/1998 | Ikefuji | 340/10.4 |
| 6,456,250 | B1 * | 9/2002 | Ying et al. | 343/702 |
| 6,734,825 | B1 * | 5/2004 | Guo et al. | 343/700 MS |
| 7,808,433 | B2 | 10/2010 | Rutfors et al. | |
| 8,502,747 | B2 * | 8/2013 | Chang | H01Q 1/243 343/700 MS |
| 2002/0000941 | A1 | 1/2002 | Johnson | |
| 2002/0021248 | A1 * | 2/2002 | Ying et al. | 343/700 MS |
| 2002/0160722 | A1 * | 10/2002 | Terranova et al. | 455/73 |

(Continued)

FOREIGN PATENT DOCUMENTS

| | | |
|---|---|---|
| CN | 1391416 A | 1/2003 |
| CN | 1630134 A | 6/2005 |

(Continued)

OTHER PUBLICATIONS

Foreign Communication From a Related Counterpart Application, International Application No. PCT/CN2010/079820, International Search Report dated Mar. 24, 2011, 4 pages.

(Continued)

*Primary Examiner* — Nay A Maung
*Assistant Examiner* — Erica Fleming-Hall
(74) *Attorney, Agent, or Firm* — Conley Rose, P.C.

(57) ABSTRACT

A method for tuning an antenna comprising determining an operating frequency band of the antenna, and adjusting a capacitance of a tunable load according to the operating frequency band, wherein the tunable load is electromagnetically coupled to the antenna via a parasitic arm, and wherein the operating frequency band depends on the capacitance.

21 Claims, 12 Drawing Sheets

(56) References Cited

U.S. PATENT DOCUMENTS

| | | |
|---|---|---|
| 2003/0210203 A1 | 11/2003 | Phillips et al. |
| 2003/0210206 A1 | 11/2003 | Phillips et al. |
| 2004/0080457 A1* | 4/2004 | Guo et al. ............... 343/700 MS |
| 2004/0227667 A1* | 11/2004 | Sievenpiper ............ 343/700 MS |
| 2004/0233109 A1* | 11/2004 | Ying et al. ............. 343/700 MS |
| 2005/0128152 A1 | 6/2005 | Milosavljevic |
| 2006/0252391 A1 | 11/2006 | Poilasne et al. |
| 2006/0281423 A1* | 12/2006 | Caimi et al. .................. 455/129 |
| 2007/0082611 A1* | 4/2007 | Terranova et al. .......... 455/41.1 |
| 2007/0139280 A1* | 6/2007 | Vance ........................... 343/702 |
| 2008/0129639 A1 | 6/2008 | Mitsugi |
| 2009/0167617 A1 | 7/2009 | Nishio |
| 2009/0224991 A1 | 9/2009 | Rowson et al. |
| 2009/0231199 A1 | 9/2009 | Vance |
| 2009/0262028 A1 | 10/2009 | Mumbru et al. |
| 2010/0103064 A1* | 4/2010 | Yang ..................... H01Q 1/243 343/793 |
| 2010/0123632 A1* | 5/2010 | Hill ....................... H01Q 1/243 343/702 |
| 2011/0294537 A1* | 12/2011 | Vance ........................ 455/550.1 |
| 2011/0312393 A1* | 12/2011 | Pulimi .................. H01Q 1/245 455/575.7 |
| 2012/0133212 A1* | 5/2012 | Kamata .......................... 307/104 |
| 2012/0146865 A1 | 6/2012 | Hayashi et al. |
| 2012/0280871 A1 | 11/2012 | Shamblin et al. |
| 2013/0016024 A1* | 1/2013 | Shi ........................ H01Q 1/243 343/833 |
| 2013/0307740 A1* | 11/2013 | Pajona .................... H01Q 7/00 343/748 |

FOREIGN PATENT DOCUMENTS

| | | | |
|---|---|---|---|
| CN | 1977425 | A | 6/2007 |
| CN | 101488772 | A | 7/2009 |
| CN | 101496222 | A | 7/2009 |
| CN | 101719584 | A | 6/2010 |
| CN | 101816078 | A | 8/2010 |
| CN | 101971417 | A | 2/2011 |
| CN | 102696149 | A | 9/2012 |
| KR | 20090057350 | A | 6/2009 |
| KR | 20100084615 | A | 7/2010 |
| WO | 2007143616 | A2 | 12/2007 |
| WO | 2009026304 | A1 | 2/2009 |
| WO | 2011059088 | A1 | 5/2011 |

OTHER PUBLICATIONS

Li, Y., et al., "A Compact Hepta-Band Loop-Inverted F Reconfigurable Antenna for Mobile Phone," IEEE Transactions on Antennas and Propagation, vol. 60, No. 1, Jan. 2012, pp. 389-392.

Elfergani, I.T.E., et al., "A Compact Size Reconfigurable PIFA Antenna for Use in Mobile Handset," IEEE 2011, 4 pages.

Arai, H., et al., Frequency Tunable Antenna by Non-Resonant Parasitic Element, Department of Electrical and Computer Engineering, Yokohama National University, 4 pages.

Ethertronics Innovate, Summary of Active Antenna Work for Bottom Right, Antenna 3 for Tier 2 Project, Dec. 10, 2011, 11 pages.

Foreign Communication From a Counterpart Application, PCT Application No. PCT/CN2013/089814, International Search Report dated Apr. 3, 2014, 6 pages.

Foreign Communication From a Counterpart Application, PCT Application No. PCT/CN2013/089814, Written Opinion dated Apr. 3, 2014, 4 pages.

Lee, D., et al., "A Compact and Low-Profile Tunable Loop Antenna Integrated with Inductors," IEEE Antennas and Wireless Propagation Letters, vol. 7, 2008, pp. 621-624.

Foreign Communication From a Counterpart Application, European Application No. 13868648.0, Extended European Search Report dated Oct. 29, 2015, 7 pages.

Foreign Communication From a Counterpart Application, Chinese Application No. 201380042752.8, Chinese Office Action dated Jan. 22, 2016, 7 pages.

Foreign Communication From a Counterpart Application, Chinese Application No. 201380042752.8, Chinese Search Report dated Jan. 12, 2016, 2 pages.

Foreign Communication From a Counterpart Application, Korean Application No. 10-2015-7017605, Korean Office Action dated Jan. 22, 2016, 7 pages.

Foreign Communication From a Counterpart Application, Korean Application No. 10-2015-7017605, English Translation of Korean Office Action dated Jan. 22, 2016, 4 pages.

* cited by examiner

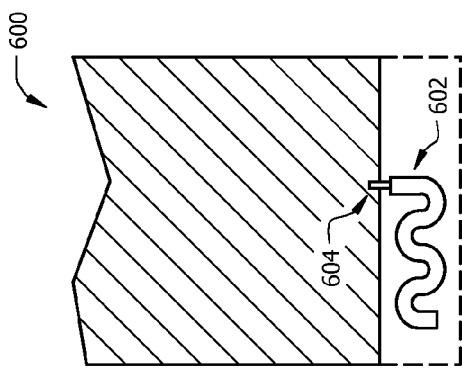
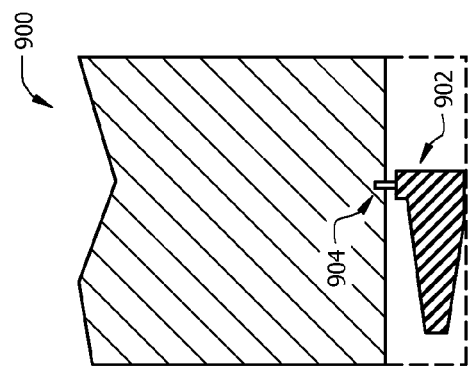
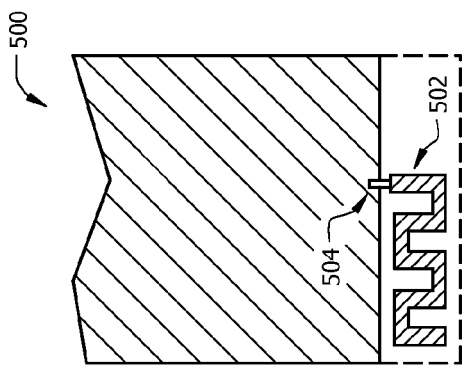
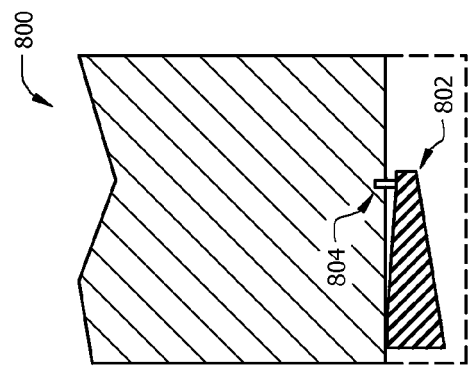
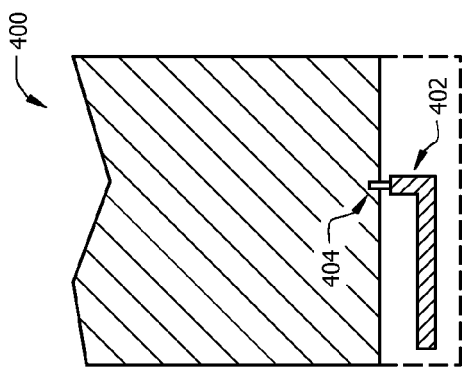
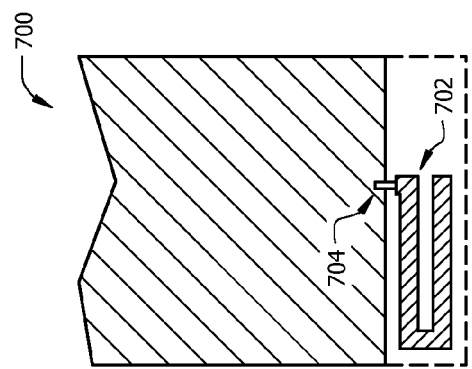

METHOD AND APPARATUS FOR A TUNABLE ANTENNA

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wireless communication technologies and services continue to proliferate leading to new voice and data services, carrier aggregation, and new demands on roaming to name a few. As technologies advance and user demand for services increases, wireless communication devices need to support an increasing number of operating frequency bands to support the technologies and services. At the same time, wireless communication devices are getting smaller. For example, mobile phones are becoming increasingly thinner, and as a result there may be less volume available for antenna structures and systems, as well as less space for the coexistence of electromechanical components around the antenna.

Smaller devices may result in the need for more compact antennas. However, more compact antennas may not cover enough frequency bands for satisfactory operation. These opposing trends—increasing demands on antennas while shrinking the volume available for antennas—lead to a need for improved antenna designs. Thus, there is a need to provide an antenna compact enough to fit in modern wireless communication devices while covering frequency bands demanded for various services.

SUMMARY

In one embodiment, the disclosure includes a method for tuning an antenna comprising determining an operating frequency band of the antenna and adjusting a capacitance of a tunable load according to the operating frequency band, wherein the tunable load is electromagnetically coupled to the antenna via a parasitic arm, and wherein the operating frequency band depends on the capacitance.

In another embodiment, the disclosure includes an apparatus comprising an antenna, a parasitic arm electromagnetically coupled to the antenna, and a tunable load coupled to the parasitic arm, wherein a capacitance of the tunable load is variable, wherein an operating frequency band of the antenna depends on the capacitance.

In yet another embodiment, the disclosure includes a wireless communication device comprising an antenna, a parasitic arm electromagnetically coupled to the antenna, a tunable load coupled to the parasitic arm, wherein a capacitance of the tunable load is variable, and wherein an operating frequency band of the antenna depends on the capacitance, and a processor coupled to the tunable load and configured to select a first operating frequency band and set the capacitance to a value to achieve the first operating frequency band.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 5-13 are cut-away views of different embodiments of parasitic arms with tunable loads.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. While certain aspects of conventional technologies have been discussed to facilitate the present disclosure, applicants in no way disclaim these technical aspects, and it is contemplated that the present disclosure may encompass one or more of the conventional technical aspects discussed herein.

Disclosed herein is a tunable antenna. For example, operating frequency bands of the tunable antenna may be adjusted by varying a load of a parasitic arm electromagnetically coupled to an antenna. Also disclosed herein is a method of tuning an antenna. For example, the antenna may be tuned by adjusting a load of a parasitic arm electromagnetically coupled to the antenna. The tunable antenna apparatuses and methods may be suitable for implementation in compact wireless communication devices.

Figure 1:
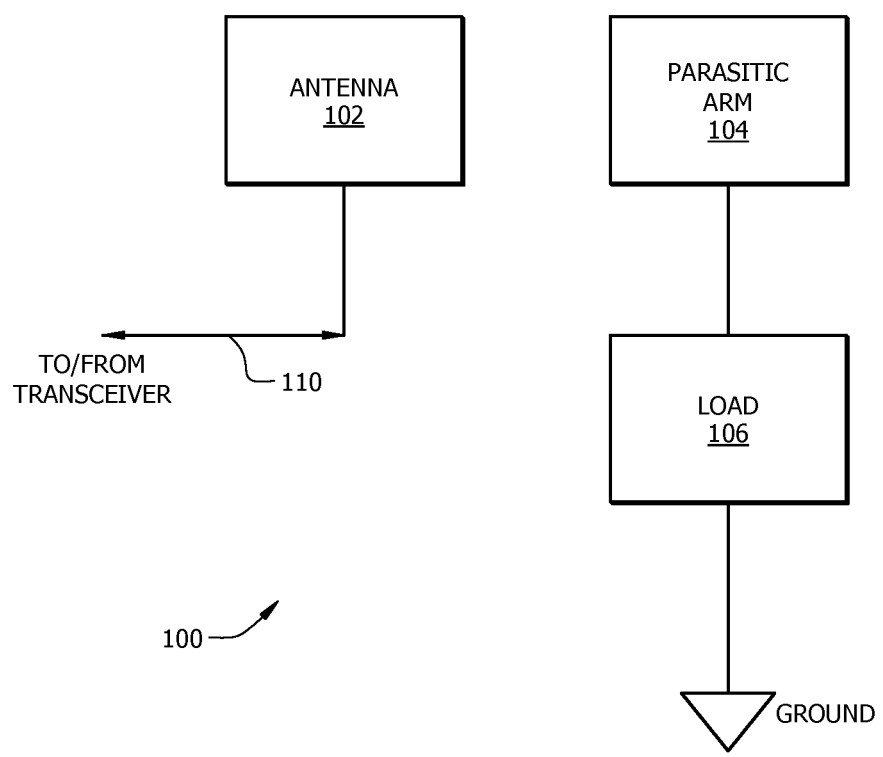
FIG. 1 is a schematic diagram of an embodiment of a tunable antenna.

FIG. 1 is a schematic diagram of an embodiment of a tunable antenna. The tunable antenna 100 comprises an antenna 102, a feed line 110, a parasitic arm 104, and a tunable load 106 configured as shown in FIG. 1. The antenna 102 may be coupled to a transceiver (not shown) via the antenna feed line 110. The parasitic arm 104 is located in close enough proximity with the antenna 102 to be coupled to the antenna 102 electromagnetically. However, as shown there may be no direct connection between the parasitic arm 104 and the antenna 102. Further, the parasitic arm 104 may be coupled to a tunable load 106. The tunable load 106 may be connected to ground as shown or may be maintained at a substantially constant non-zero voltage level. The tunable load may have a variable or tunable impedance (i.e., combination of resistance, capacitance, and/or inductance). For example, a fixed or non-tunable inductor may be placed in series with a tunable capacitor to provide a variable impedance. The tunable capacitor may be implemented as a radio frequency (RF) switching device, a varactor, a single pole multi throw ("SPxT") switch, a digital tunable capacitor ("DTC"), or a micro-electromechanical system ("MEMS") capacitor array. These are illustrative examples as the tunable load 106 may be implemented by any suitable technology.

The antenna 102 may be any antenna type that allows for variable and continuous tuning by adjusting the tunable load 106. Such antenna types include but are not limited to inverted-F antennas ("IFAs"), loop antennas, slot antennas, or folded inverted conformal antennas (FICAs).

Regardless of the type of antenna or tunable load used, the parasitic arm 104 and the antenna 102 are coupled to each other electromagnetically. The parasitic arm 104 may be tuned separately from the antenna by varying the tunable load 106 coupled to the parasitic arm. Varying the tunable load affects the operating frequency band of the antenna 102, thus adjusting at least one operating parameter of the antenna 102 without the need to add capacitance directly to the antenna.

Continuous tuning of the antenna 102 may be possible if tuning capabilities of the tunable load 106 are continuous. For example, because both a DTC and a MEMS capacitor array may be continuously tunable, the selection of either of these tunable loads may result in a continuously tunable antenna. Further, the antenna apparatus may be implemented to enable dynamically tunable configurations with suitable feedback mechanism for mitigating different antenna loadings, such as the front proximity sensor for head detection, or other sensors/detectors. For example, the capacitance of the tunable load 106 may be in the range of 1.8 picofarads (pF) to 5 pF with different loads resulting in different bands for the antenna 102 as shown in Table 1. The inductance of the tunable load may be relatively constant at about 10 nanohenries (nH). (In Table 1 the "Low Band" may have a return loss less than −4 decibels (dB), and the "High Band" may have a return loss of less than −6 dB). As shown in Table 1, with a loading of the parasitic arm of about 1.8 pF, the low band may be in the range of about 870 megahertz (MHz) to 960 MHz and the high band may be in the range of about 1.42 to 1.59 gigahertz (GHz); with a loading of the parasitic arm of about 2.5 pF, the low band may be in the range of about 810 MHz to 890 MHz and the high band may be in the range of about 1.74 GHz to 2.27 GHz; and with loading of the parasitic arm of about 5 pF, the low band may be in the range of about 690 MHz to 750 MHz, and the high band may be in the range of 1.66 GHz to 2.26 GHz. By adjusting the tunable load 106, the antenna performance may be tuned for a predefined frequency band, or a particular operating channel, depending on the requirements of a wireless device employing the tunable antenna 100. A tunable antenna with the characteristics of Table 1 may support Long Term Evolution (LTE) bands 11, 12, 13, 17, 18, 19, and 21, as examples, as bands 12, 13, 17, 18, and 19 may be in a range from 690 MHz to 960 MHz and bands 11 and 21 may be in a range from 1.42 GHz to 1.51 GHz. Such a tunable antenna may also support multiple Universal Mobile Telecommunications System ("UMTS")/Wideband Code Division Multiple Access (W-CDMA)/Global System for Mobile Communications ("GSM") frequency bands, such as frequency bands located at 850 MHz, 900 MHz, 1800 MHz, and 1900 MHz.

TABLE 1

Low Band and High Band for various loads in a tunable antenna embodiment.

| Loading of parasitic arm | Low band | High band |
| --- | --- | --- |
| 1.8 pF | 870 MHz-960 MHz | 1.42 GHz-1.59 GHz |
| 2.5 pF | 810 MHz-890 MHz | 1.74 GHz-2.27 GHz |
| 5 pF | 690 MHz-750 MHz | 1.66 GHz-2.26 GHz |

Since adjusting the operating frequency band of the antenna is enabled by varying the tuning load on the parasitic arm, the antenna performance enables a wider range of bandwidths without the need for a larger antenna. Thus, as a result of being able to keep the antenna smaller while increasing the performance, the volume of area needed for the antenna apparatus as a whole may be decreased, enabling production of smaller devices.

In designing the antenna apparatus, the amount of electrical energy from surrounding circuitry components, as well as outside environmental influences, may be taken into consideration. For example, antenna performance may be affected by additional electrical energy within the surrounding circuit board as emitted by neighboring circuitry components. For this reason, the antenna(s) may be placed in a region, sometimes referred to as a "keepout" area, that does not include copper (e.g., grounding) or electrical components on the PCB. A keepout area may be intended to keep the antenna(s) away from any nearby conductors or electrical components that could degrade antenna performance. Additionally, the antenna apparatus may be affected by outside environmental issues (e.g., the proximity of a user's head to a mobile device containing the antenna apparatus).

Figure 2A:
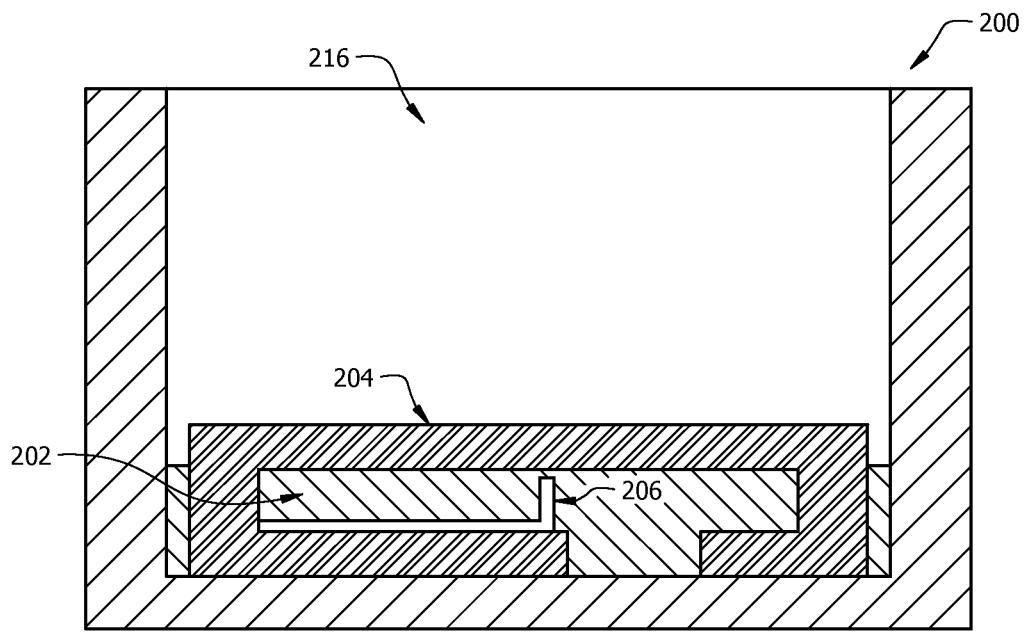
FIGS. 2A and 2B are cut-away views of an embodiment of a tunable antenna.
Figure 2B:
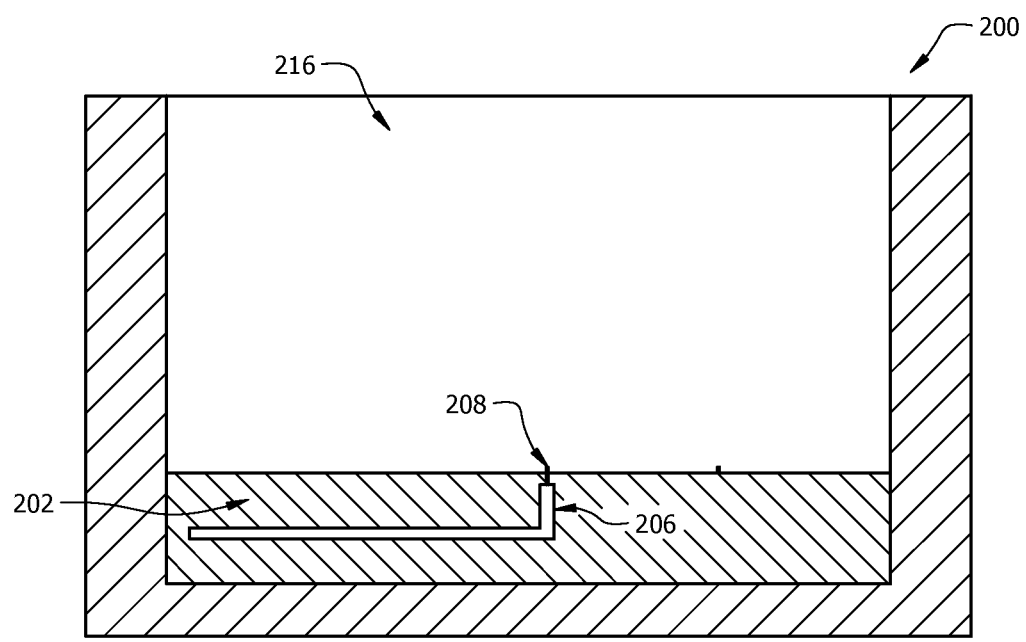

FIGS. 2A and 2B are cut-away views of an embodiment of a tunable antenna in a wireless communication device 200. The tunable antenna comprises an antenna 204 and a parasitic arm 206. Both FIG. 2A and FIG. 2B show an x-y plane view of an example wireless communication device 200 comprising a parasitic arm 206; however, FIG. 2B omits the antenna for a clearer view of the parasitic element coupling. In particular, FIG. 2A shows an example placement, shape, and size of parasitic arm 206 in relation to the apparatus as a whole.

Referring again to FIG. 2A, the parasitic arm 206, which may be made of a conductive material (e.g. copper), is traced onto a printed circuit board (PCB) and is electromagnetically coupled to antenna 204. In many cases, the PCB may be FR4, which may be a glass-reinforced epoxy laminate. Both the parasitic arm 206 and the antenna 204 are supported and encapsulated within the keepout area 202 of the PCB. Because the parasitic arm 206 is electromagnetically coupled to the antenna 204, and does not require physical coupling to the antenna 204, the parasitic arm 206 may be placed at a plurality of locations in proximity to the antenna 204. For example, there may be a four millimeter space between the parasitic arm and the antenna.

In order to more clearly understand the placement and coupling of the parasitic arm, FIG. 2B shows the antenna apparatus with the antenna removed. In particular, parasitic arm 206 is located within the nonconductive keepout area 202 and coupled to a tunable load 208. Both the parasitic arm 206 and the tunable load 208 are electromagnetically coupled but not physically coupled to the antenna. The parasitic arm 206 has a fixed inductance, and the tunable load 208 comprises a tunable capacitor. The tunable load 208 may further comprise a fixed inductor in parallel with the tunable capacitor. The combination of the parasitic arm 206 and the tunable load 208 may be viewed as a variable impedance. The tunable load 208 may be connected to a ground plane 216. As understood by one of skill in the art, a ground plane 216 may be a substantially flat conducting surface. Further, although not shown in the figure there may be other electrical components occupying some of the area shown as being occupied by the ground plane 216.

Figure 3A:
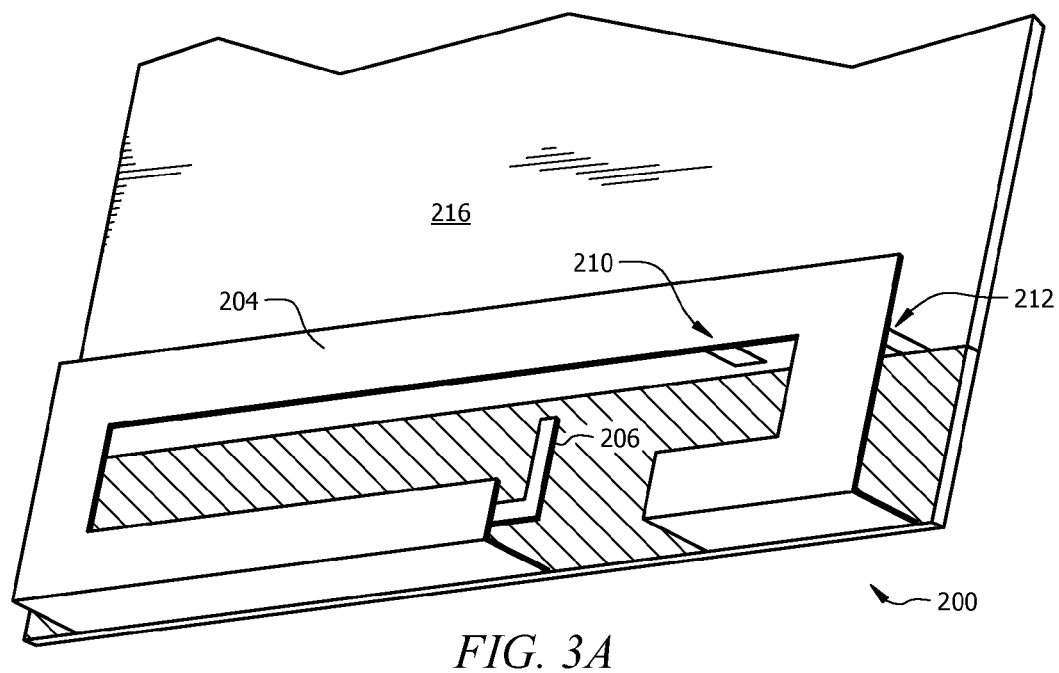
FIGS. 3A and 3B are perspective cut-away views of an embodiment of a tunable antenna.

FIG. 3A shows a perspective cut-away view of the wireless communication device 200 in order to further illustrate the relationship of the parasitic arm 206 with respect to the antenna 204. As shown in FIG. 3A, the parasitic arm 206 may be located above the antenna element 204, and between to the two ends of the antenna element 204. Further, FIG. 3A illustrates an antenna feed line 210, as well as the antenna ground line 212, to which the antenna 204 is coupled. The feed line 210 couples the antenna 204 to a transceiver and the antenna ground line 212 couples the antenna 204 to ground.

Antenna 204 may reside on an antenna carrier, or plastic housing (not shown), which resides four millimeters above the PCB. The parasitic arm 206 may be printed on the PCB and thus may reside four millimeters below the antenna 204.

Figure 3B:
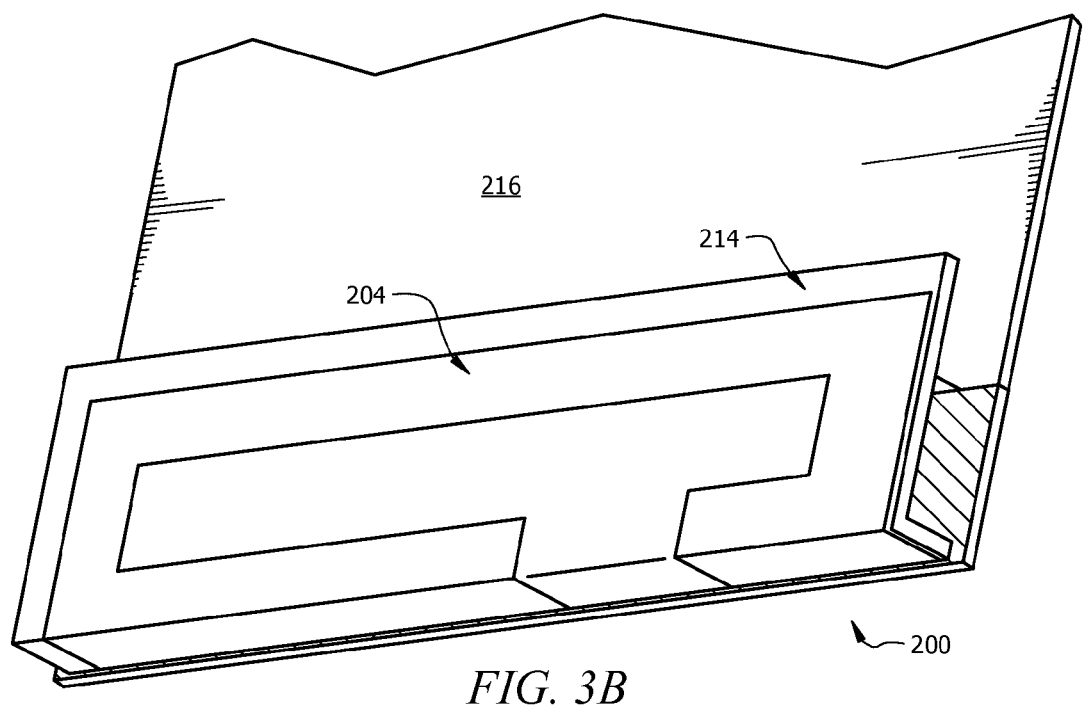

FIG. 3B shows the same perspective cut-away view of the wireless communication device 200 of FIG. 3A, but with the housing 214 shown. Note that a view of the parasitic arm 206, the antenna feed line 210, and antenna ground line 212 is obstructed by the housing 214. The housing 214 provides a surface separated from the PCB on which all or part of the antenna 204 may reside. For example, the antenna 204 may be deposited or traced onto the housing 214.

The tunable antenna configuration illustrated in FIGS. 2A, 2B, 3A, and 3B may be used to achieve the results presented in Table 1. The relationship shown in FIGS. 2A, 2B, 3A, and 3B is one example of many possible relationships between an antenna, such as antenna 204, and a parasitic arm, such as parasitic arm 206, that result in electromagnetic coupling. The tunable load used for the results in Table 1 (and the results of FIGS. 18 and 19 below) is a DTC in parallel with a fixed inductor.

Figure 4:
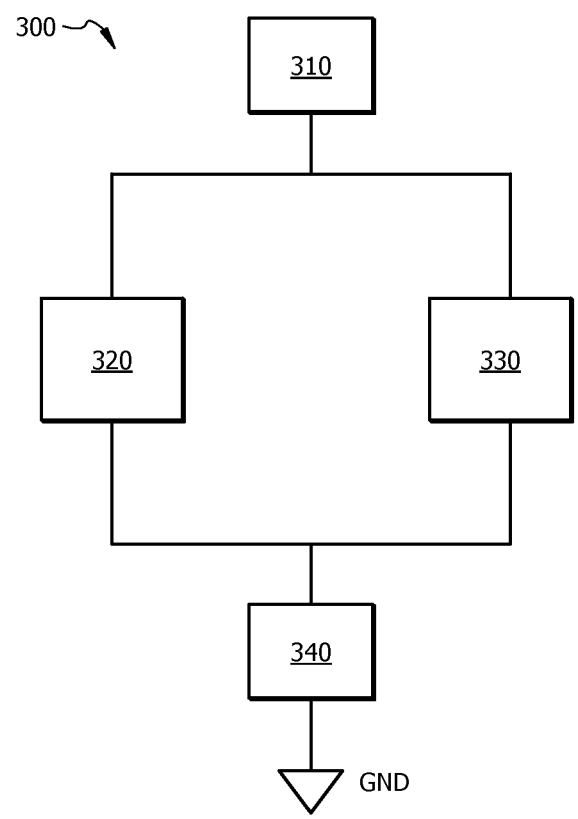
FIG. 4 is a block diagram of a general tunable load that may be used in a wireless device.

FIG. 4 is a block diagram of a general tunable load 300 that may be used in a wireless device. The tunable load 300 comprises parasitic arm 310 and a variable impedance 320. The tunable load may optionally include a fixed impedance 330 and a fixed impedance 340 connected to ground (or a ground plane) as shown. Each of the fixed impedances 330 and 340 may be an inductor, a capacitor, or a resistor. The variable impedance 320 may be a tunable capacitor. Thus, the fixed impedance 330 may be in parallel with the variable impedance 320, and the combination may be in series with a fixed impedance 340. The tunable load 300 may be electromagnetically coupled to an antenna via the parasitic arm 310.

The size of the parasitic arm may vary depending on the needs of the device utilizing the antenna apparatus. For example, in one embodiment, the parasitic arm may be of a larger size to enable a wider range of accessible bandwidths. In another embodiment, however, the parasitic arm may be of a smaller size on order to provide tuning of the antenna in a smaller device, such as a small and/or thin handheld mobile device.

The parasitic arm is not restrained to only one shape as the shape of the parasitic arm may vary depending on the needs of the device utilizing the antenna apparatus. For example, in one embodiment, the device may be a rectangular shaped smart phone comprising a rectangular shaped printed circuit board (PCB). Thus, in one embodiment, the shape of the parasitic arm may be "L" shaped in order to enable optimal coupling for a rectangular PCB. However, in another embodiment, in order to enable performance of the antenna tuning, the parasitic arm may be of another shape, such as a straight line or an "S" shape.

In one example embodiment, the device containing the antenna apparatus may be a handheld wireless device such as a mobile phone. In this embodiment, the mobile phone may be four inches across, with a keepout area measuring 9 millimeters (mm) thick. The load of the parasitic arm 206 may have a capacitor tuning range of about 1.8 pF to 5 pF, yielding a ratio between smallest and largest capacitance of approximately 1 to 2.7.

A tunable antenna according to this disclosure is not limited to the particular embodiments in FIGS. 2A, 2B, 3A, and 3B, as those figures illustrate an example exemplary embodiment. Tunable antennas according to this disclosure may have a variety of embodiments. FIGS. 4-12 illustrate example embodiments of parasitic arms with tunable loads. FIGS. 4-12 illustrate a variety of shapes of parasitic arms covered by this disclosure. The operating frequency band of a tunable antenna may depend not only on impedance of a tunable load, but also depend on the shape the parasitic arm.

Figure 11:
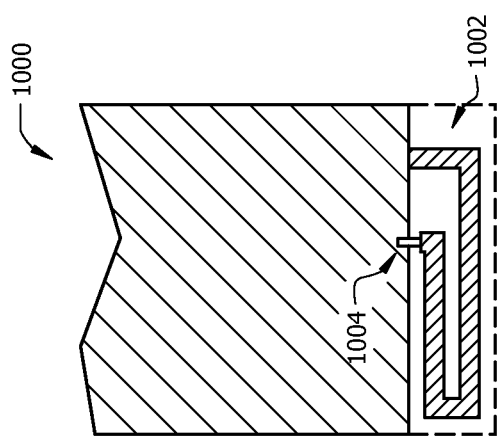
Figure 12:
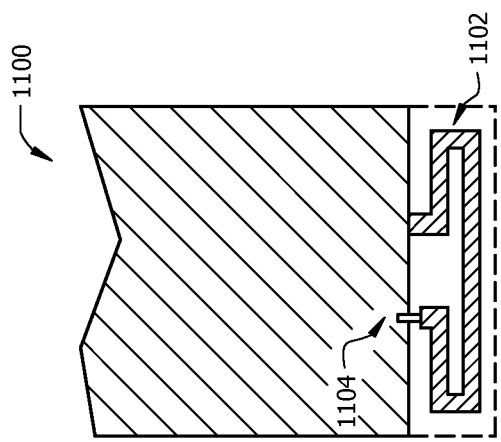

FIG. 5 is a cut-away view of an embodiment of a parasitic arm 402 and tunable load 404 in a wireless communication device 400. Likewise, FIGS. 6-10 are cut-away views of embodiments of parasitic arms 502, 602, 702, 802, and 902, respectively. The parasitic arms in FIGS. 6-10 are coupled to tunable loads 504, 604, 704, 804, and 904, respectively, with the tunable loads connected to a ground plane. FIGS. 11 and 12 are cut-away views of embodiments of parasitic arms 1002 and 1102. Each of parasitic arms 1002 and 1102 may be coupled to tunable loads 1004 and 1104, respectively, at one end of the parasitic arms. Further each of parasitic arms 1002 and 1102 may be coupled to a ground plane at another end as shown. The parasitic arms in FIGS. 5-12 may be electromagnetically coupled to an antenna, such as antenna 204 in FIGS. 3A and 3B. FIGS. 5-12 represent portions of wireless communication devices 400-1100, respectively.

Figure 13:
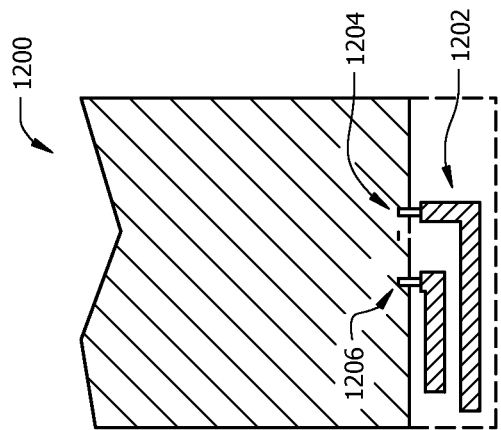

FIG. 13 is a cut-away view of an embodiment of two parasitic arms 1202 and 1206, which may be electromagnetically coupled to an antenna. The parasitic arms 1202 and 1206 may be coupled to tunable loads 1204 and 1208, respectively. Thus, the operating frequency band of a tunable antenna may also depend on the number of parasitic arms and tunable loads.

Figure 14:
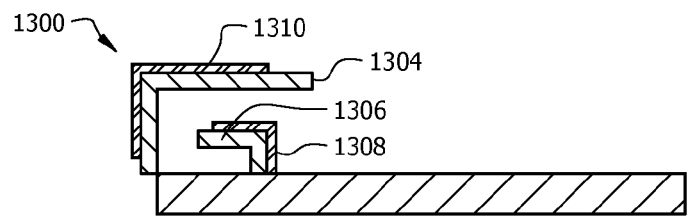
FIG. 14 is a side view of another embodiment of a tunable antenna.

FIG. 14 is a side view of another embodiment of a tunable antenna 1300. The tunable antenna comprises an antenna 1310 and a parasitic arm 1308. The antenna 1310 may reside on a first housing 1304, and the parasitic arm 1308 may reside on a second housing 1308. The tunable antenna further comprises a tunable load (not shown).

Figure 15:
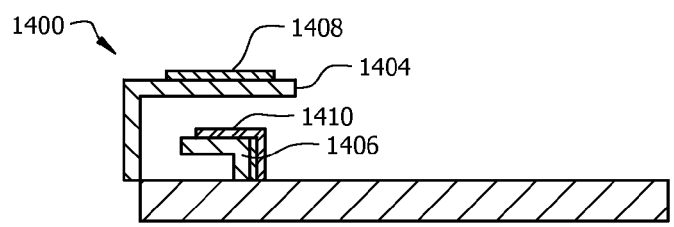
FIG. 15 is a side view of yet another embodiment of a tunable antenna.

FIG. 15 is a side view of another embodiment of a tunable antenna 1400. The tunable antenna comprises an antenna 1410 and a parasitic arm 1408. The antenna 1410 may reside on a first housing 1406, and the parasitic arm 1408 may reside on a second housing 1404. The tunable antenna further comprises a tunable load (not shown).

Figure 16A:
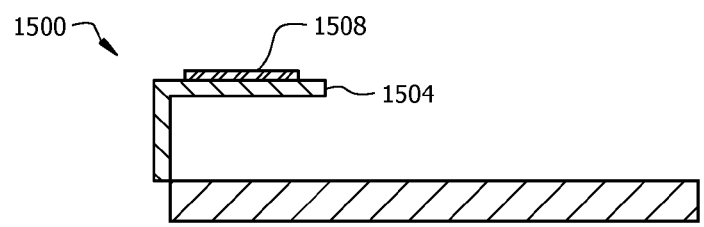
FIGS. 16A, 16B, and 16C are various cut-away views of yet another embodiment of a tunable antenna.
Figure 16B:
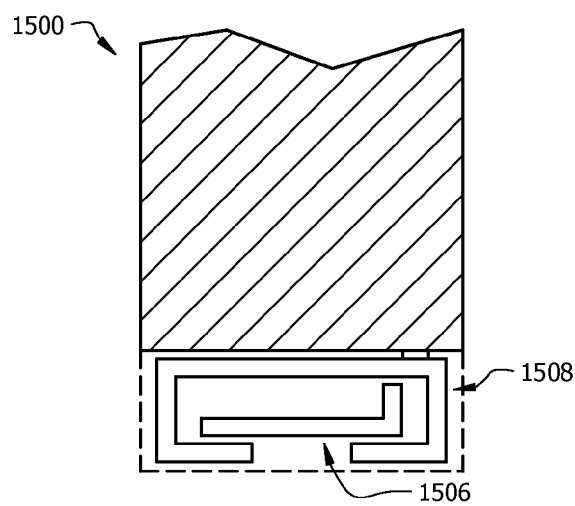
Figure 16C:
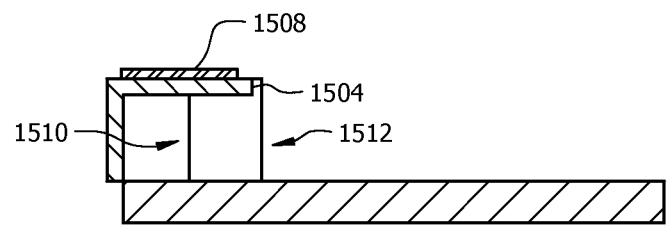

FIG. 16A is a cut-away side view of another embodiment of a tunable antenna in a wireless communication device 1500. The tunable antenna comprises an antenna 1508 situated on a housing 1504 as shown in FIG. 16A. FIG. 16B shows a top view of the tunable antenna. The top view illustrates a parasitic arm 1506 as part of the tunable antenna 1500. FIG. 16C is also a side view of the tunable antenna but with the connections 1510 and 1512 to ground plane shown (the connections are not shown in FIG. 16A). The connection 1510 connects the parasitic arm 1506 to a ground plane, and the connection 1512 connects the antenna 1508 to the ground plane. The tunable antenna may further comprise a tunable load that may be placed between the parasitic arm 1506 and the ground plane.

Figure 17A:
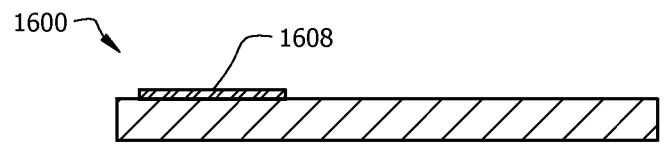
FIGS. 17A, 17B, and 17C are various cut-away views of yet another embodiment of a tunable antenna.
Figure 17B:
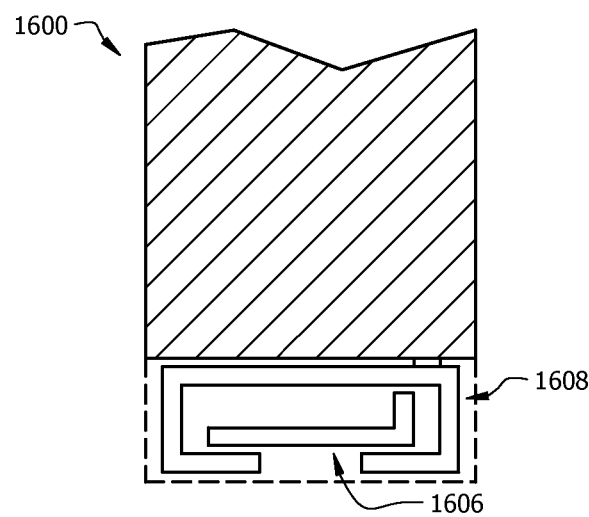
Figure 17C:
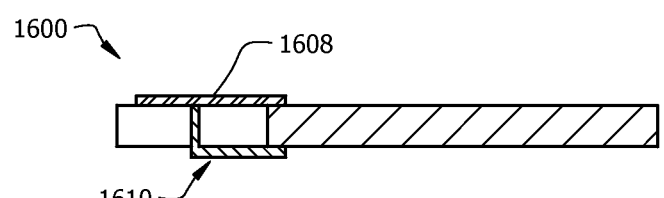

FIG. 17A is a cut-away side view of another embodiment of a tunable antenna in a wireless communication device 1600. The tunable antenna comprises an antenna 1608 situated on a PCB as shown in FIG. 17A. FIG. 17B shows a top view of the tunable antenna. The top view illustrates a parasitic arm 1606 as part of the tunable antenna. FIG. 17C is also a side view of the tunable antenna but with the connection 1610 to ground plane shown (the connection is not shown in FIG. 17A). The connection 1610 connects the parasitic arm 1606 to a ground plane using a via. The tunable antenna may further comprise a tunable load that may be placed between the parasitic arm 1606 and the ground plane. The tunable antenna may be on one side of the PCB, and the ground plane may be on an opposing side of the PCB. FIGS. 17A-17C demonstrate that a tunable antenna may reside only on a PCB (i.e., may use no housing).

Figure 18:
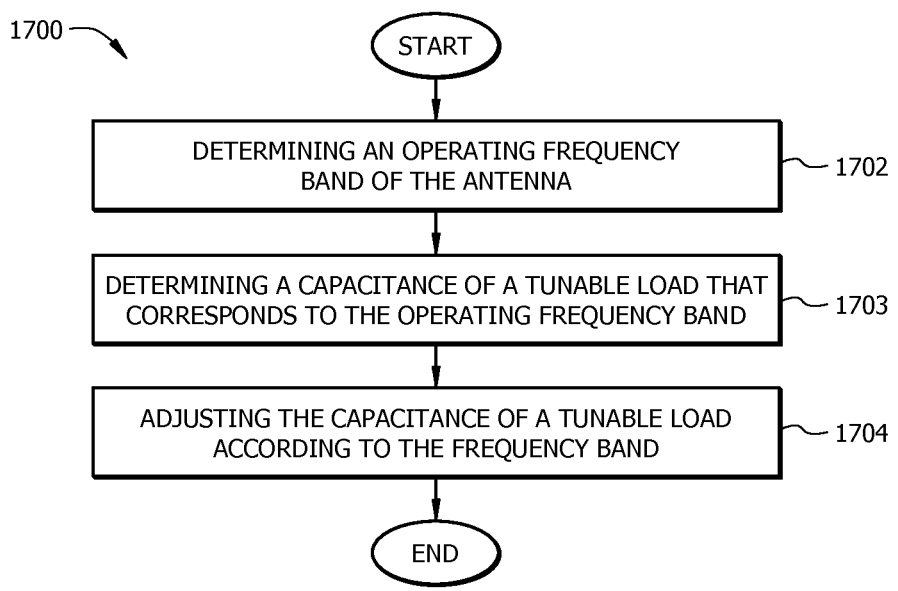
FIG. 18 is a flowchart of an embodiment of a tunable antenna method.

FIG. 18 is a flowchart 1700 of an embodiment of a method for tuning an antenna. In step 1702 an operating frequency band of an antenna is selected or determined. For example, the antenna may be employed in a wireless communication device that needs to use a low band in the range of 0.69 GHz to 0.75 GHz. In step 1703, a capacitance of a tunable load that corresponds to the selected frequency band of step 1702 is determined. The capacitance may be determined by accessing a lookup table, such as Table 1, containing operating frequencies corresponding to capacitance values. In step 1704 a capacitance of a tunable load may be adjusted according to the frequency band. The steps in the flowchart 1700 may be repeated periodically or at predetermined time intervals or any time a wireless communication device employing the method needs to change operating frequency bands.

In the method for tuning an antenna described in FIG. 18, the tunable load may be electromagnetically coupled to the antenna via a parasitic arm, and wherein the operating frequency band depends on the capacitance. In one embodiment, a processor coupled to the communication device may access a table of related capacitance values and operating frequency bands stored in memory. The table may be generated from laboratory experimentation or simulation models to determine that tuning the capacitance to a certain value results in a specific range of operating frequency bands. When a communication device requests a specific operating frequency band, the processor may look up in the table the capacitance value associated with the requested operating frequency band. The processor may then tune the load on the parasitic arm to the retrieved capacitance value, resulting in the correct tuning of the antenna.

Figure 19:
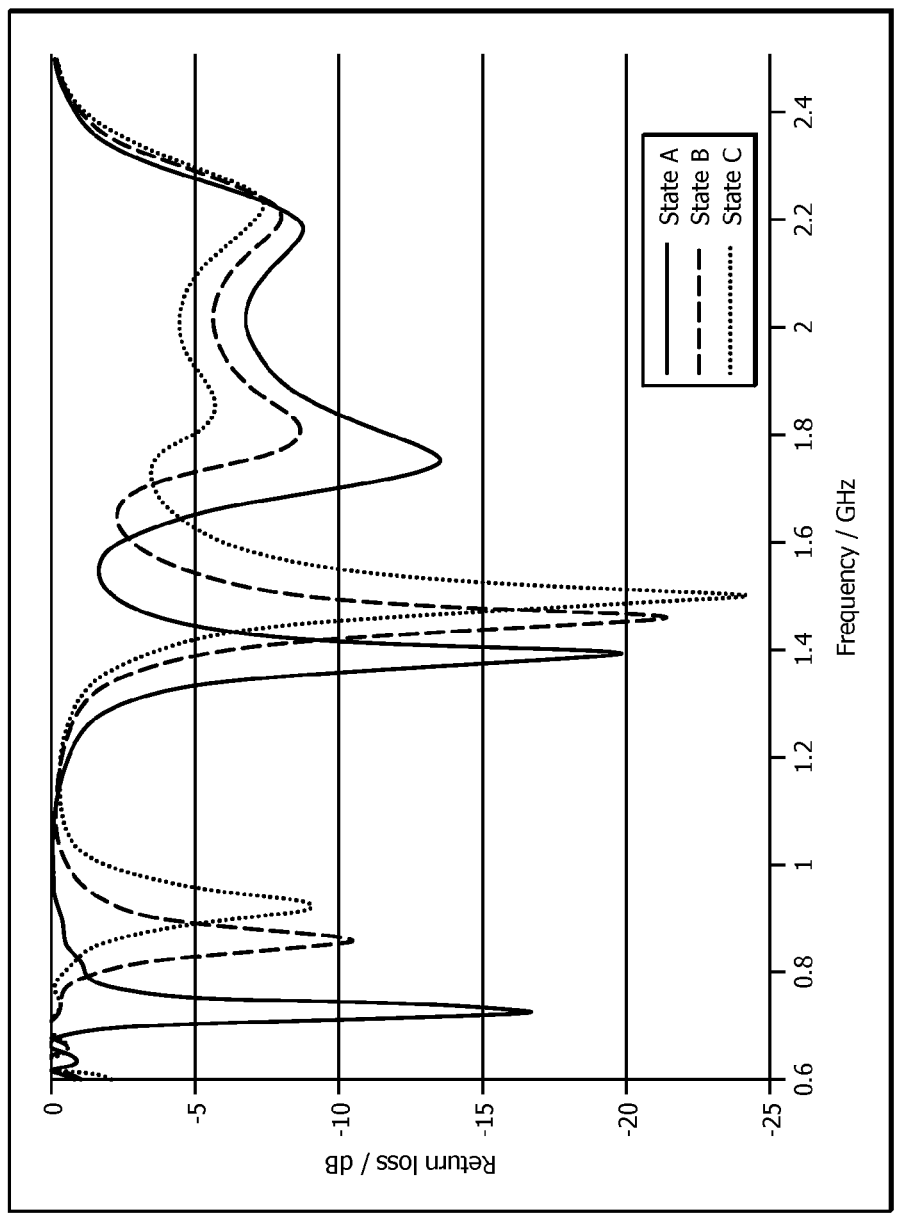
FIG. 19 is a line graph showing the return loss for three loads of a tunable antenna.

FIG. 19 is a line graph depicting the return loss for three loads of the tunable antenna illustrated in FIGS. 2A, 2B, 3A, and 3B. The tunable load used for these results is a DTC. State A, represented by a solid line as shown in FIG. 19, represents return loss when the tunable load has a capacitance of about 5 pF. State B, represented by a dashed line as shown in FIG. 19, represents return loss when the tunable load has a capacitance of about 2.5 pF. In particular, FIG. 19 shows that for State B the tunable antenna has a return loss of approximately −21 dB at a frequency of 1 GHz, has a return loss of approximately −13 dB at a frequency of 1.75 GHz, and a return loss of 0 dB at a frequency of 2.4 GHz. State C, represented by a dotted line as shown in FIG. 19, represents return loss when the tunable load has a capacitance of about 1.8 pF. For example, FIG. 19 shows that for State C the tunable antenna has a return loss of approximately 0 dB at a frequency of 1.45 GHz, has a return loss of approximately −24 dB at a frequency of 1.5 GHz, and a return loss of −5 dB at a frequency of 2 GHz. As shown in FIG. 19, the results indicate that the tunable antenna in State A may exhibit satisfactory performance for LTE band 17; the tunable antenna in State B may exhibit satisfactory performance at an operating low band frequency of 850 MHz; and the tunable antenna in State C may exhibit satisfactory performance at an operating low band frequency of 900 MHz.

Figure 20:
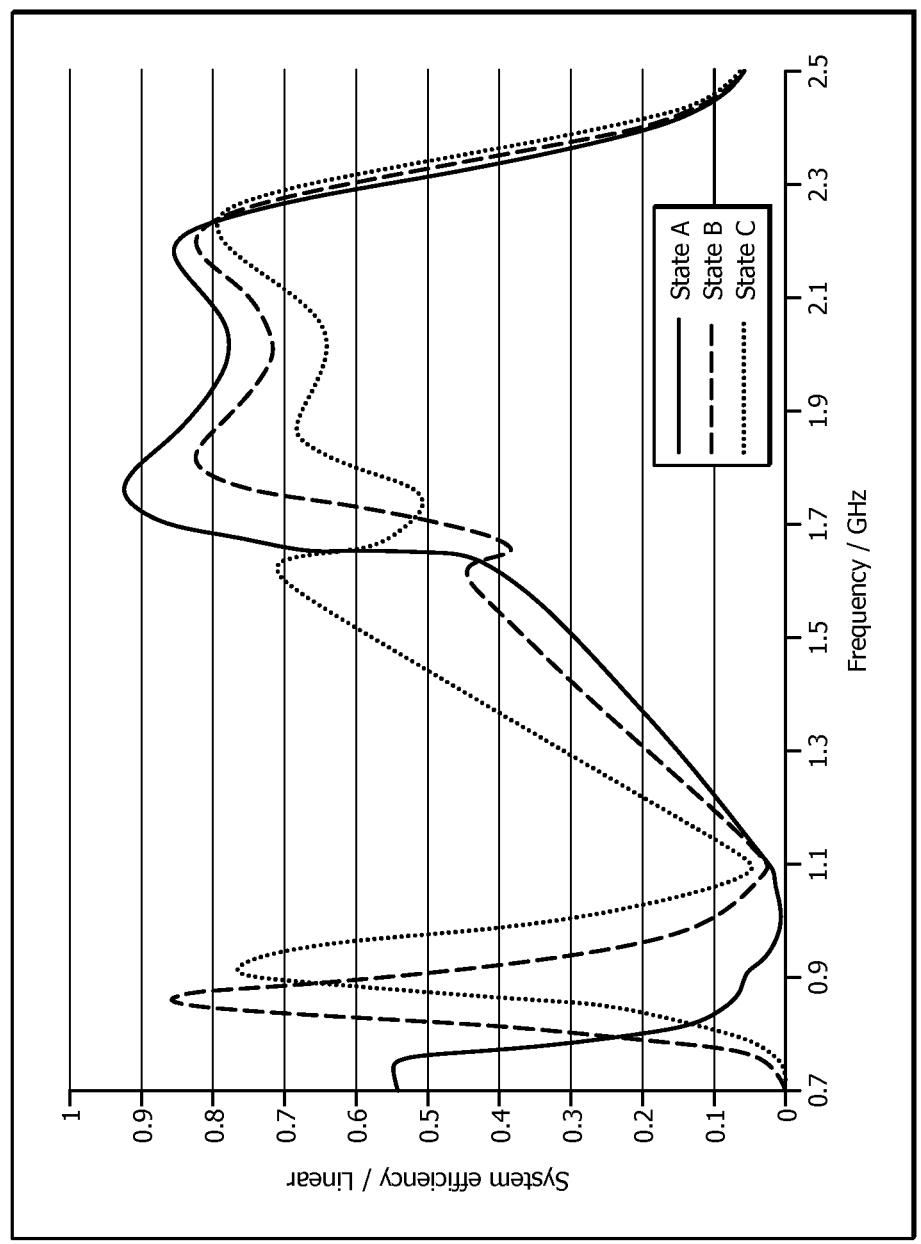
FIG. 20 is a line graph showing the system efficiency of three loads of a tunable antenna.

FIG. 20 shows a line graph depiction the system efficiency for three loads of the tunable antenna illustrated in FIGS. 2A, 2B, 3A, and 3B. As understood by one of skill in the art, system efficiency is a measure of how efficiently the power delivered to the antenna can be radiated into free space. State A, represented by a solid line as shown in FIG. 20, represents system efficiency when the tunable load has a capacitance of about 5 pF. In particular, FIG. 20 shows that State A has a system efficiency of 55% at a frequency of approximately 0.7 GHZ, having a peak efficiency of approximately 92% at frequency of 1.78 GHz, and 5% system efficiency at a frequency of 2.5 GHz. State B, represented by a dashed line as shown in FIG. 20, represents return loss when the tunable load has a capacitance of about 2.5 pF. In particular, FIG. 20 shows that State B has a system efficiency of 45% at a frequency of approximately 1.5 GHZ, having a peak efficiency of approximately 85% at frequency of 0.8 GHz, and 5% system efficiency at a frequency of 2.5 GHz. State C, represented by a dotted line as shown in FIG. 20, represents return loss when the tunable load has a capacitance of about 1.8 pF. For example, FIG. 20 shows that in State C the tunable antenna has a system efficiency of 55% at a frequency of approximately 1.0 GHZ, a peak efficiency of approximately 75% at frequency of 0.95 GHz, and a system efficiency of 5% at a frequency of 2.5 GHz.

Figure 21:
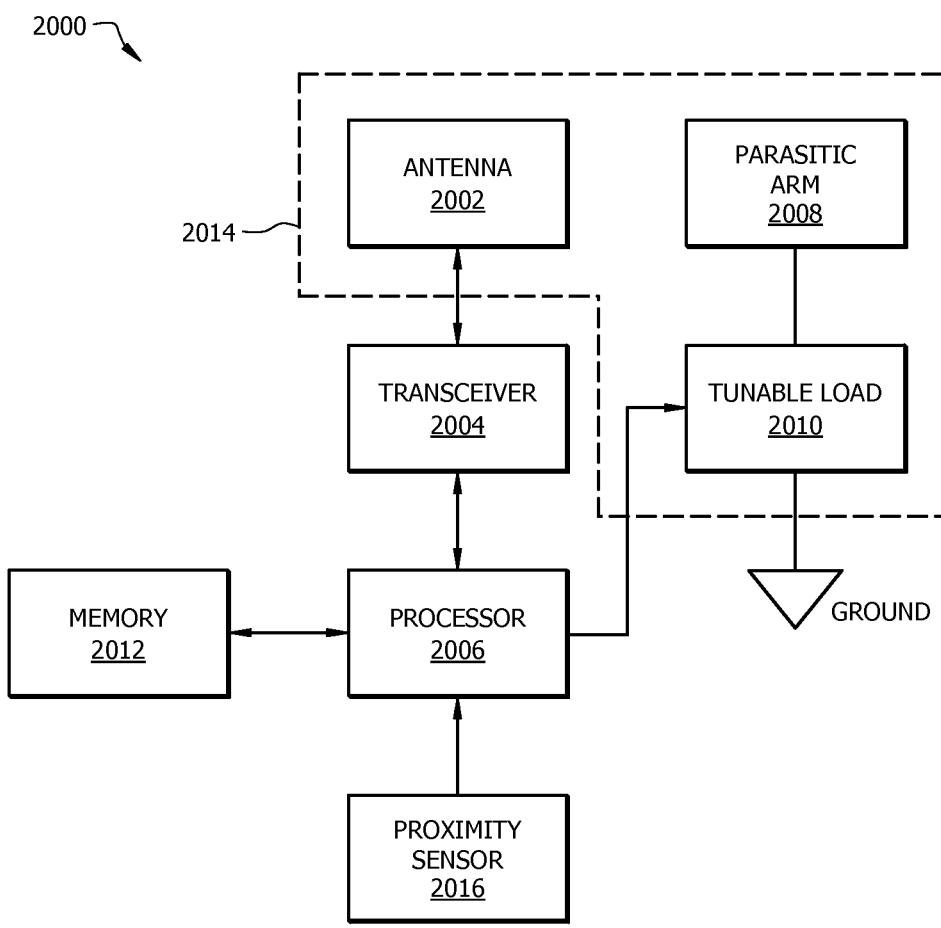
FIG. 21 is a schematic diagram of an embodiment of a communication device.

FIG. 21 is a schematic diagram of an embodiment of a wireless communication device 2000. The communication device 2000 comprises a transceiver 2004, a processor 2006, a memory 2012, and a tunable antenna 2014 as shown in FIG. 21. The tunable antenna 2014 comprises an antenna 2002, a parasitic arm 2008, and a tunable load 2010 as shown in FIG. 21. The tunable antenna 2014 is configured such that the parasitic arm 2008 and the antenna 2002 are electromagnetically coupled. For example, the tunable antenna may be configured similarly to the tunable antenna shown in FIGS. 2A, 2B, 3A, and 3B. The tunable load 2010 may be any type of tunable load discussed herein, such as a varactor or a MEMS capacitor array. The processor 2006 may be implemented as one or more central processing unit or CPU chips, cores (e.g., a multi-core processor), field-programmable gate arrays (FPGAs), application specific integrated circuits (ASICs), and/or digital signal processors (DSPs). The tunable load 2010 may be controlled by the processor 2006. The processor 2006 may be implemented using hardware, software, or both. The memory 2012 may be used to store volatile or non-volatile data including instructions for the processor 2006. The memory 2012 may comprise read-only memory (ROM), a random access memory (RAM), and/or secondary storage devices such as tape drives or disk drives. The wireless communication device 2000 may be a cellular phone, smart phone, tablet computer, laptop computer or any other type of wireless communication device that needs to employ a plurality of operating bands.

The wireless communication device 2000 may optionally include a proximity sensor 2016 as shown in FIG. 21. A proximity sensor may detect the proximity of a human head or other objects. An object in close proximity to the wireless communication device 2000 may affect the return loss of the antenna 2002. A proximity sensor, for example, may comprise a capacitive sensor comprising one or more capacitors to assist in detecting a presence and a proximity of a human body relative to a wireless device. A person of skill in the art will recognize that there are many types of available proximity sensors. Therefore, the processor 2006 may take into account feedback from the proximity sensor in selecting a capacitance of tunable load 2010.

There may be a control interface between the processor 2006 and the tunable load 2010 to allow the processor 2006 to control the tunable load 2010. The control interface may be Serial Peripheral Interface Bus (SPI), a Mobile Industry Processor Interface (MIPI), or any other suitable interface. The processor 2006 may be configured to send a control signal to the tunable load 2010 and the tunable load 2006 may be configured to receive the control signal and adjust the capacitance accordingly.

The memory 2012 may store a table, such as Table 1, of operating frequency bands for the communication device 2000 and associated capacitance values of tunable load 2010 that achieve those frequency bands. The processor 2006 may load or access the table from memory 2012. If the communication device 2000 desires to use a frequency band, the processor 2006 may look up the associated capacitance value of the tunable load 2010 in the table and send a control signal to the tunable load to set the capacitance of the tunable load 2010. For example, a communication device (e.g., a mobile phone) may request an operating frequency band of about 870 MHz to 960 MHz. Using Table 1 as an example, the processor 2006 may access the table stored in the memory 2012 to see that the associated capacitance value to achieve an operating frequency band of about 870 MHz to 960 MHz is 1.8 pF. The processor 2006 may then adjust the capacitance of the tunable load 2010 to 1.8 pF in order to achieve the requested operating frequency band. Further, the table stored in memory may take into account readings from the proximity sensor in the lookup of tunable load. For example, operating frequency band may be a function of a proximity measurement and a tunable load.

It is understood that by programming and/or loading executable instructions onto the communication device 2000, at least one of the processor 2006 or the memory 2012 may be changed, transforming the communication device 2000 in part into a particular machine or apparatus having the novel functionality taught by the present disclosure, such as the method 1700. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

References to "one embodiment," "an embodiment," "some embodiment," "various embodiments," or the like, indicate that a particular element or characteristic is included in at least one embodiment of the invention. Although the phrases may appear in various places, the phrases do not necessarily refer to the same embodiment.

The above discussion is meant to be illustrative of the principles and various embodiments of the present invention. Numerous variations and modifications will become apparent to those skilled in the art once the above disclosure is fully appreciated. For example, while the various embodiments have been described in terms of a variable tunable antenna coupled to a parasitic arm, this context shall not be read as a limitation as to the scope of one or more of the embodiments described—the same techniques may be used for other embodiments. It is intended that the following claims be interpreted to embrace all such various and modifications.

What is claimed is:

1. A method for tuning an antenna comprising:
    determining an operating frequency band of the antenna, the antenna being a dual-arm antenna having arms of different lengths, the arms having ends that face each other without the arms overlapping; and
    adjusting a capacitance of a tunable load according to the operating frequency band, the tunable load being electromagnetically coupled to the antenna via a loop-type parasitic arm disposed within a boundary of a keepout area laterally adjacent to a ground plane, the keepout area being a non-conductive region on a printed circuit board (PCB), and the operating frequency band depending on the capacitance.

2. The method of claim 1, further comprising:
    retrieving a capacitance value related to the operating frequency band of the antenna from a table stored in memory; and
    wherein adjusting the capacitance further comprises adjusting the capacitance to the capacitance value retrieved from the table stored in memory.

3. The method of claim 2, wherein the operating frequency band is one of a plurality of available operating frequency bands, and wherein the method further comprises:
    determining a second operating frequency band of the antenna from among the plurality of available operating frequency bands; and
    adjusting the capacitance of the tunable load according to the second operating frequency band.

4. The method of claim 1, wherein the antenna resides on a housing and the loop-type parasitic arm resides on the PCB.

5. The method of claim 3, wherein the tunable load comprises one of a variable capacitor, a digital tunable capacitor, a micro-electromechanical system (MEMS) capacitor array, and a varactor.

6. The method of claim 3, wherein the capacitance of the tunable load is tunable in the range of about 1.8 picofarads (pF) to about 5 pF, wherein if the tunable load is about 1.8 pF an operating frequency low band is about 0.69 gigahertz (GHz) to about 0.75 GHz and an operating frequency high band is about 1.66 GHz to about 2.26 GHz, wherein if the tunable load is about 2.5 pF the operating frequency low band is about 0.81 GHz to about 0.89 GHz and the operating frequency high band is about 1.74 GHz to 2.27 GHz, and wherein if the tunable load is about 1.8 pF the operating frequency low band is about 0.87 GHz to about 0.96 GHz and the operating frequency high band is about 1.42 GHz to about 1.59 GHz.

7. An apparatus comprising:
    a dual-arm antenna having arms of different lengths, the arms having ends that face each other without the arms overlapping;
    a loop-type parasitic arm electromagnetically coupled to the dual-arm antenna, the loop-type parasitic arm disposed within a boundary of a keepout area laterally adjacent to a ground plane, the keepout area being a non-conductive region on a printed circuit board (PCB); and
    a tunable load coupled to the loop-type parasitic arm, wherein a capacitance of the tunable load is variable and an operating frequency band of the dual-arm antenna depending on the capacitance.

8. The apparatus of claim 7, wherein the tunable load is configured to receive a control signal and adjust the capacitance according to the control signal.

9. The apparatus of claim 8, wherein the dual-arm antenna resides on the PCB and the loop-type parasitic arm resides on a housing that allows the dual-arm antenna to be physically separated from the PCB.

10. The apparatus of claim 8, wherein the capacitance of the tunable load is tunable in the range of about 1.8 picofarads (pF) to about 5 picofarads, wherein if the tunable load is about 1.8 pF an operating frequency low band is about 0.69 gigahertz (GHz) to about 0.75 GHz and an operating frequency high band is about 1.66 GHz to about 2.26 GHz, wherein if the tunable load is about 2.5 pF the operating frequency low band is about 0.81 GHz to about 0.89 GHz and the operating frequency high band is about 1.74 GHz to 2.27 GHz, and wherein if the tunable load is about 1.8 pF the operating frequency low band is about 0.87 GHz to about 0.96 GHz and the operating frequency high band is about 1.42 GHz to about 1.59 GHz.

11. The apparatus of claim 10, wherein the loop-type parasitic arm resides on the PCB and the dual-arm antenna resides on a housing that allows the dual-arm antenna to be physically separated from the PCB.

12. A wireless communication device comprising:
    a dual-arm antenna having arms of different lengths, the arms having ends that face each other without the arms overlapping;
    a loop-type parasitic arm electromagnetically coupled to the dual-arm antenna, the loop-type parasitic arm being disposed within a boundary of a keepout area laterally adjacent to a ground plane, the keepout area being a non-conductive region on a printed circuit board (PCB);
    a tunable load coupled to the loop-type parasitic arm, a capacitance of the tunable load being variable and an operating frequency band of the dual-arm antenna depending on the capacitance; and
    a processor coupled to the tunable load, the processor configured to select a first operating frequency band and set the capacitance to a value to achieve the first operating frequency band.

13. The wireless communication device of claim 12, further comprising:
    a memory coupled to the processor, the processor further configured to:
        access a table stored in the memory, the table containing at least one capacitance value related to at least one operating frequency band; and
        retrieve a capacitance value related to the first operating frequency band in the table,
    wherein setting the capacitance to the value to achieve the first operating frequency band further comprises sending a control signal to the tunable load to set the capacitance to the capacitance value related to the first operating frequency band in the table.

14. The wireless communication device of claim 13, wherein the first operating frequency band is selected from among a plurality of available operating frequency bands, and wherein the processor is further configured to:
  select a second operating frequency band different from the first operating frequency band from among the plurality of available operating frequency bands; and
  set the capacitance to a second value to achieve the second operating frequency band.

15. The wireless communication device of claim 13, wherein the tunable load comprises one of a variable capacitor, a digital tunable capacitor, a micro-electromechanical system (MEMS) capacitor array, or a varactor.

16. The wireless communication device of claim 13, wherein the loop-type parasitic arm and the tunable load reside on the PCB, and the dual-arm antenna does not reside on the PCB.

17. The wireless communication device of claim 13, further comprising a proximity sensor coupled to the processor, the processor further configured to receive a proximity sensor measurement and take the proximity sensor measurement into account in selecting the first operating frequency band.

18. The wireless communication device of claim 13, wherein the parasitic arm and the dual-arm antenna reside on one side of the PCB, and the loop-type parasitic arm couples to a ground plane on an opposing side of the PCB using a via.

19. A method for tuning an antenna comprising:
  determining an operating frequency band of the antenna, the antenna being a dual-arm antenna having two arms of different lengths, the two arms having ends that face each other without the two arms overlapping; and
  adjusting a capacitance of a tunable load according to the operating frequency band, the tunable load being electromagnetically coupled to the antenna via a parasitic arm disposed within a boundary of a non-conductive keepout area laterally adjacent to a ground plane, and the operating frequency band depending on the capacitance.

20. An apparatus comprising:
  a dual-arm antenna having two arms of different lengths, the two arms having ends that face each other without the two arms overlapping;
  a parasitic arm electromagnetically coupled to the dual-arm antenna, the parasitic arm being disposed within a boundary of a non-conductive keepout area laterally adjacent to a ground plane; and
  a tunable load coupled to the parasitic arm, a capacitance of the tunable load being variable and an operating frequency band of the antenna depending on the capacitance.

21. A wireless communication device comprising:
  a dual-arm antenna having two arms of different lengths, the two arms having ends that face each other without the two arms overlapping;
  a parasitic arm electromagnetically coupled to the dual-arm antenna, the parasitic arm being disposed within a boundary of a non-conductive keepout area laterally adjacent to a ground plane;
  a tunable load coupled to the parasitic arm, a capacitance of the tunable load being variable and an operating frequency band of the dual-arm antenna depending on the capacitance; and
  a processor coupled to the tunable load and configured to select a first operating frequency band and set the capacitance to a value to achieve the first operating frequency band.

* * * * *

UNITED STATES PATENT AND TRADEMARK OFFICE
CERTIFICATE OF CORRECTION

PATENT NO. : 10,122,402 B2
APPLICATION NO. : 13/732097
DATED : November 6, 2018
INVENTOR(S) : Shing Lung Steven Yang et al.

Page 1 of 1

It is certified that error appears in the above-identified patent and that said Letters Patent is hereby corrected as shown below:

In the Claims

Column 13, Lines 23-27, Claim 18 should read:
18. The wireless communication device of claim 13, wherein the loop-type parasitic arm and the dual-arm antenna reside on one side of the PCB, and the loop-type parasitic arm couples to a ground plane on an opposing side of the PCB using a via.

Signed and Sealed this
Eleventh Day of December, 2018

Andrei Iancu
*Director of the United States Patent and Trademark Office*